(12) United States Patent
Hui et al.

(10) Patent No.: US 10,609,736 B2
(45) Date of Patent: Mar. 31, 2020

(54) METHOD AND APPARATUS FOR TRANSMITTING RA PREAMBLE IN NR SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Junhyeong Kim, Daejeon (KR); Gosan Noh, Daejeon (KR); Hee Sang Chung, Daejeon (KR); Sung Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 15/934,140

(22) Filed: Mar. 23, 2018

(65) Prior Publication Data
US 2018/0279387 A1   Sep. 27, 2018

(30) Foreign Application Priority Data

Mar. 24, 2017 (KR) .................. 10-2017-0037827
Mar. 23, 2018 (KR) .................. 10-2018-0034138

(51) Int. Cl.
*H04W 74/08* (2009.01)
*H04W 74/00* (2009.01)
(Continued)

(52) U.S. Cl.
CPC ....... *H04W 74/0891* (2013.01); *H04L 5/0053* (2013.01); *H04L 27/261* (2013.01);
(Continued)

(58) Field of Classification Search
CPC ......... H04W 74/0891; H04W 74/0833; H04W 74/002; H04W 88/08; H04W 88/02;
(Continued)

(56) References Cited

U.S. PATENT DOCUMENTS 8,259,645 B2   9/2012   Lim et al.
2013/0315163 A1*  11/2013  Zhang .................... H04L 5/001
                                                          370/329
(Continued)

OTHER PUBLICATIONS

ZTE, "[89-16] Email discussion on NR-PRACH preamble formats based on short sequence length", R1-1711270, 3GPP TSG RAN WG1 NR Ad-Hoc#2, Qingdao, China, pp. 1-43, Jun. 27-30, 2017.
(Continued)

*Primary Examiner* — Ajay Cattungal
(74) *Attorney, Agent, or Firm* — Rabin & Berdo, P.C.

(57) ABSTRACT

A method and an apparatus for transmitting a message used to access a base station (BS) in a random access (RA) procedure by user equipment (UE) are provided. The method includes: determining a first RA preamble resource corresponding to an SSB index which corresponds to a transmission beam among a plurality of transmission beams of BS; and transmitting a message 1 of the RA procedure by using a first RA preamble format which includes the first RA preamble resource and at least one second RA preamble resource which neighbors the first RA preamble resource.

17 Claims, 12 Drawing Sheets

(51) Int. Cl.
*H04W 88/08* (2009.01)
*H04W 88/02* (2009.01)
*H04L 5/00* (2006.01)
*H04L 27/26* (2006.01)
*H04W 16/28* (2009.01)
*H04W 4/70* (2018.01)

(52) U.S. Cl.
CPC ..... *H04W 74/002* (2013.01); *H04W 74/0833* (2013.01); *H04W 88/02* (2013.01); *H04W 88/08* (2013.01); *H04L 5/0007* (2013.01); *H04W 4/70* (2018.02); *H04W 16/28* (2013.01)

(58) Field of Classification Search
CPC ...... H04W 4/70; H04L 5/0053; H04L 27/261; H04L 5/0007
See application file for complete search history.

(56) References Cited

U.S. PATENT DOCUMENTS

| | | | |
|---|---|---|---|
| 2014/0036811 A1* | 2/2014 | Zhang | H04L 27/2602 370/329 |
| 2014/0355509 A1* | 12/2014 | Zhao | H04L 61/2069 370/312 |
| 2015/0195827 A1* | 7/2015 | Feng | H04W 72/048 380/270 |
| 2016/0174261 A1* | 6/2016 | Yang | H04L 5/0053 370/329 |
| 2017/0053578 A1 | 2/2017 | Chen et al. | |
| 2017/0135001 A1 | 5/2017 | Kim et al. | |
| 2018/0167946 A1* | 6/2018 | Si | H04W 72/0486 |
| 2018/0220450 A1* | 8/2018 | Aiba | H04W 74/004 |
| 2018/0254863 A1* | 9/2018 | Choi | H04L 5/0032 |
| 2018/0270869 A1* | 9/2018 | Tsai | H04W 76/27 |
| 2019/0230696 A1* | 7/2019 | Kim | H04W 74/0833 |

OTHER PUBLICATIONS

3GPP TR 38.802 V1.3.0, 3rd Generation Partnership Project; Technical Specification Group Radio Access Network; Study on New Radio (NR) Access Technology; Physical Layer Aspects (Release 14), pp. 1-124, Feb. 2017.

ETRI, "On RACH format design for NR", R1-1708093, 3GPP TSG RAN WG1 Meeting #89, Hangzhou, P.R. China, pp. 1-6, May 15-19, 2017.

* cited by examiner

| RA preamble 1 | RA preamble 2 | RA preamble 3 | ... | RA preamble N | GT |

FIG. 4B

| ... | RA preamble N | RA preamble 1 | RA preamble 2 | RA preamble 3 | ... | RA preamble N | RA preamble 1 | ... | GT |

FIG. 4C

| RA preamble N | RA preamble 1 | RA preamble 2 | RA preamble 3 | ... | RA preamble N | RA preamble 1 | GT |

… 
METHOD AND APPARATUS FOR TRANSMITTING RA PREAMBLE IN NR SYSTEM

CROSS-REFERENCE TO RELATED APPLICATION

This application claims priority to and the benefit of Korean Patent Applications Nos. 10-2017-0037827 and 10-2018-0034138 filed in the Korean Intellectual Property Office on Mar. 24, 2017 and Mar. 23, 2018, the entire contents of which are incorporated herein by reference.

BACKGROUND OF THE INVENTION

(a) Field of the Invention

This relates to a method and an apparatus for transmitting a message of a random access procedure in a 3GPP NR system.

(b) Description of the Related Art

In 3GPP NR (new radio) analog beam forming based on a beam sweeping scheme is considered in order to enhance a system performance. Basically, the beam sweeping scheme is expected to be used for user equipment (UE) and NR base stations (gNB). Accordingly, the entire system including a signaling, a control channel, and so on needs to be designed to support single-beam operation and multi-beam operation.

SUMMARY OF THE INVENTION

An exemplary embodiment provides a method for transmitting a message for random access by using an RA preamble format including a plurality of RA preamble resources.

Another exemplary embodiment provides user equipment for transmitting a message for random access by using an RA preamble format including a plurality of RA preamble resources.

Yet another exemplary embodiment provides a method for receiving a message for random access from a plurality of RA preamble resources by performing a beam sweeping scheme.

According to an exemplary embodiment, a method for transmitting a message used to access a base station (BS) in a random access (RA) procedure by a user equipment (UE) is provided. The transmitting method includes: determining a first RA preamble resource corresponding to an synchronization signal block (SSB) index which corresponds to a transmission beam among a plurality of transmission beams of BS; and transmitting a message 1 of the RA procedure by using a first RA preamble format which includes the first RA preamble resource and at least one second RA preamble resource which neighbors the first RA preamble resource.

The index of the at least one second RA preamble resource may be i−1 or i+1 if an index of the first RA preamble resource is i.

The first RA preamble format may further include a guard time (GT) period allocated at the end of the first RA preamble resource and the at least one second RA preamble resource on a time axis.

An RA preamble transmitted through the first RA preamble resource and the at least one second RA preamble resource may include a cyclic prefix (CP) and a preamble sequence, and the preamble sequence may include a plurality of orthogonal frequency division multiplexing (OFDM) symbols.

The first RA preamble format may be a long RA preamble format or a short RA preamble format, and a time length of the long RA preamble format may be an integer multiple of a time length of the short RA preamble format.

The transmitting a message 1 may include transmitting the message 1 by using the long RA preamble format if a coverage of a cell of the BS is relatively wide; or transmitting the message 1 by using the short RA preamble format if the coverage of the cell is relatively small.

The transmitting method may further include re-transmitting the message 1 by using a second RA preamble format having a longer time length than the first RA preamble format if the BS fails to receive the message 1.

The transmitting method may further include: receiving a synchronization signal through the plurality of transmission beams from the BS; and measuring the reception strength of the plurality of transmission beams.

According to another exemplary embodiment, user equipment (UE) for transmitting a message used to access a base station (BS) in a random access (RA) procedure is provided. The UE includes a processor, a memory, and a radio frequency (RF) unit, wherein the processor executes a program stored in the memory to perform: determining a first RA preamble resource of which an index is the same as a synchronization signal block (SSB) index which corresponds to a transmission beam among a plurality of transmission beams of the BS; and transmitting a message 1 of the RA procedure by using a first RA preamble format which includes the first RA preamble resource and at least one second RA preamble resource which neighbors the first RA preamble resource.

An index of the at least one second RA preamble resource may be i−1 or i+1 if an index of the first RA preamble resource is i.

The first RA preamble format may further include a guard time (GT) period allocated at the end of the first RA preamble resource and the at least one second RA preamble resource on a time axis.

An RA preamble transmitted through the first RA preamble resource and the at least one second RA preamble resource may include a cyclic prefix (CP) and a preamble sequence, and the preamble sequence may include a plurality of orthogonal frequency division multiplexing (OFDM) symbols.

The first RA preamble format may be a long RA preamble format or a short RA preamble format, and a time length of the long RA preamble format may be an integer multiple of a time length of the short RA preamble format.

When transmitting the message 1, the processor performs transmitting the message 1 by using the long RA preamble format if a coverage of a cell of the BS is relatively wide; or transmitting the message 1 by using the short RA preamble format if the coverage of the cell is relatively small.

The processor may execute the program to further perform re-transmitting the message 1 by using a second RA preamble format having a longer time length than the first RA preamble format if the BS fails to receive the message 1.

The processor may execute the program to further perform: receiving a synchronization signal through the plurality of transmission beams from the BS; and measuring the reception strength of the plurality of transmission beams.

According to yet another exemplary embodiment, a method for receiving a message during a random access (RA) procedure from user equipment (UE) is provided. The method includes: transmitting a synchronization signal and a physical broadcasting channel (PBCH) through a plurality of transmission beams to the UE; and receiving the message from at least one preamble resource determined based on reception strength of the plurality of transmission beams by performing a reception beam sweeping.

DETAILED DESCRIPTION OF THE EMBODIMENTS

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification. Throughout the specification, user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTC device, and the like. Further, the base station (BS) may be called an advanced base station (ABS), a high reliability base station (HR-BS), a node B, an evolved node B (eNodeB), a gNodeB (gNB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

Figure 1:
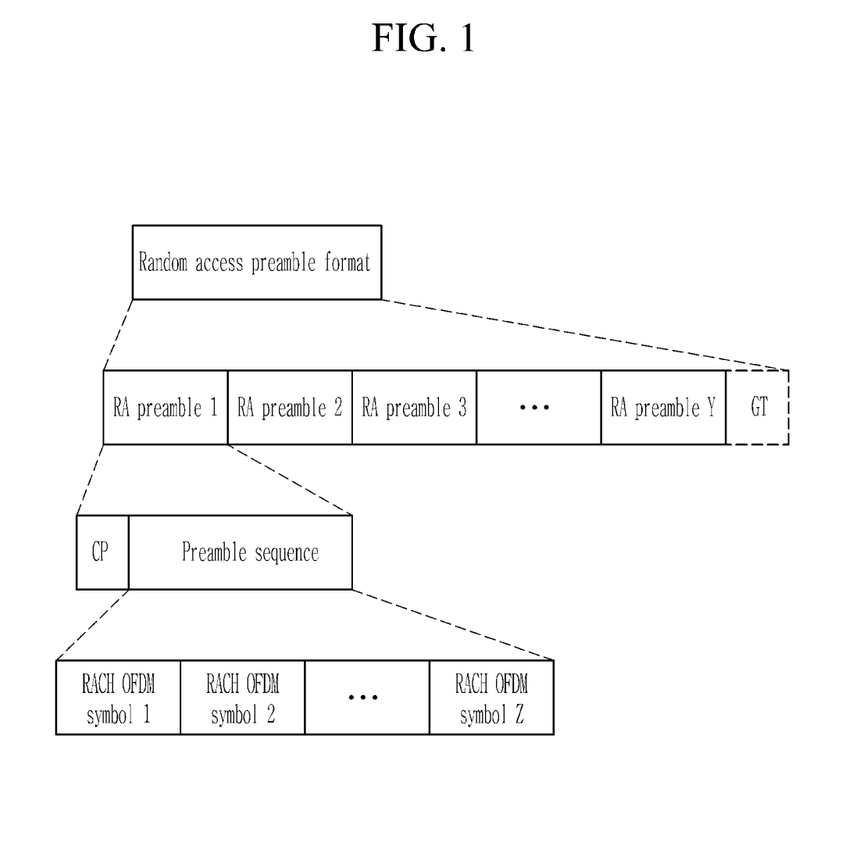
FIG. 1 is a schematic diagram illustrating a PRACH of a 3GPP NR system according to an exemplary embodiment.

FIG. 1 is a schematic diagram illustrating a PRACH of a 3GPP NR system according to an exemplary embodiment.

Referring to FIG. 1, a random access (RA) preamble format of a Physical Random Access Channel (PRACH) includes a guard time (GT) period and Y RA preambles in order to support a single beam operation and a multi-beam operation. The GT may be allocated at the end or the RA preamble format. The RA preamble resources included in an RA preamble format may be used for a reception beam sweeping of the base station. The Y value (that is, the number of RA preamble resources) is related to the number of transmission (Tx) beams and reception (Rx) beams of the base station. An RA preamble transmitted through one RA preamble resource includes a cyclic prefix (CP) and a plurality of preamble sequences. The CP may be used to compensate for a multi-path delay and a time delay due to the beam sweeping. Similar to the 3GPP LTE (long term evolution) system, each preamble sequence includes one or multiple Orthogonal Frequency Division Multiplexing (OFDM) symbols (Z OFDM symbols as shown in FIG. 1) corresponding to a cell coverage, respectively. In the NR system, the UE may transmit a message 1 (Msg. 1) of the RA procedure by using the RA preamble format. In the 3GPP NR system, the UE may use a long RA preamble format or a short RA preamble format.

The PRACH resources and the RA preamble format in the NR system should be suitable for both single-beam operation and multi-beam operation. In addition, the PRACH resources and the RA preamble format should be suitable for both with beam correspondence and without beam correspondence cases. In this case, 'with beam correspondence' may represent that a reciprocity exists between the Tx beam and the Rx beam.

Figure 2:
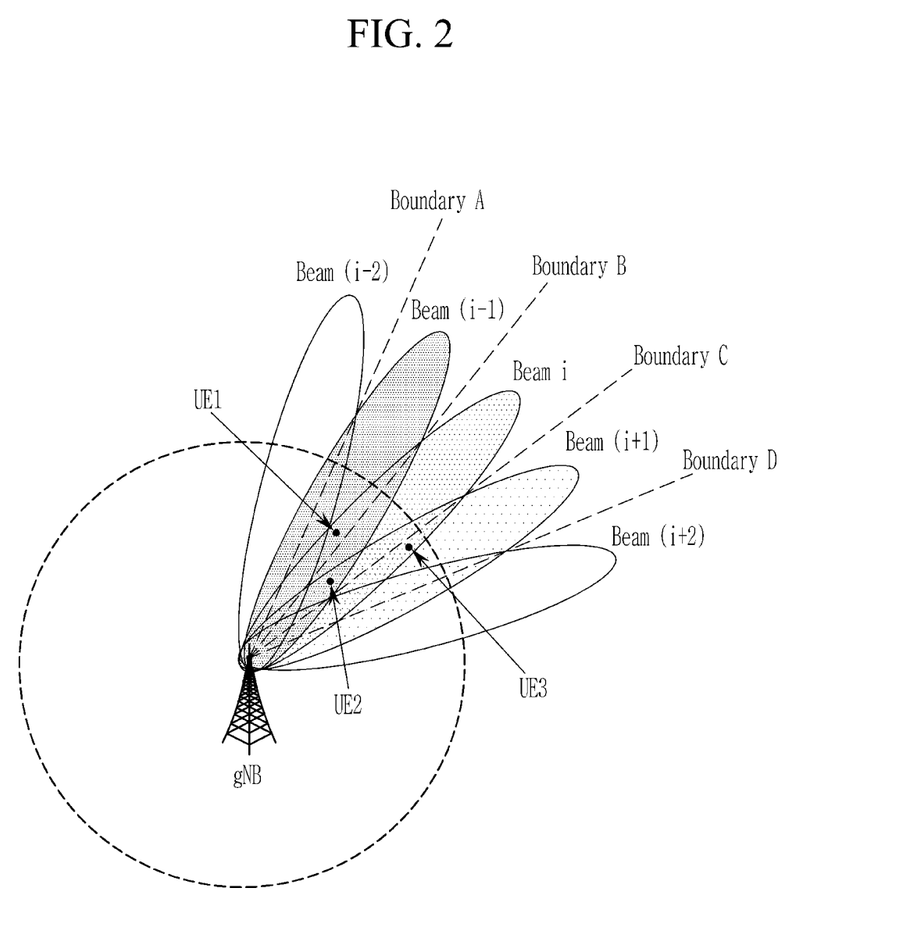
FIG. 2 is a diagram illustrating a multi-beam pattern of the base station according to an exemplary embodiment.
Figure 3:
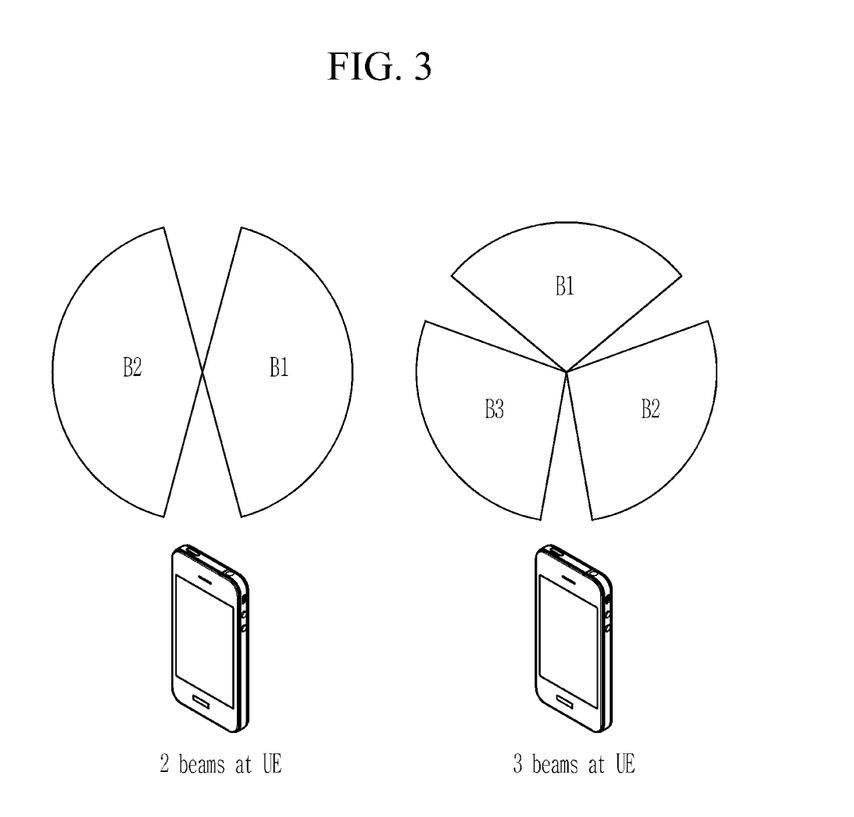
FIG. 3 is a diagram illustrating a multi-beam pattern of the UE according to the exemplary embodiment.

FIG. 2 is a diagram illustrating a multi-beam pattern of the base station according to an exemplary embodiment, and FIG. 3 is a diagram illustrating a multi-beam pattern of the UE according to the exemplary embodiment.

When the base station according to the exemplary embodiment performs hybrid beamforming, analog beamforming using the beam sweeping scheme may be used to provide services to UEs in different directions according to the concept of spatial division multiple access (SDMA). Within each beam direction, a digital 3D (three-dimensional) beamforming technique may be used to improve system performance. According to the exemplary embodiment, since the UE should first find the beam direction in an initial access stage when it attempts to access the network, the analog beamforming scheme based on the beam sweeping through the multi-beam operation may be described. A digital beamforming scheme may be implemented after the UE establishes links with the network.

Referring to FIG. 2, the base station may operate the Tx beam and the Rx beam in a multi-beam scheme. The total number of Tx beams and Rx beams is assumed to be N, respectively. For example, it may be assumed that the Tx beam pattern and the Rx beam pattern of the base station are the same. Referring to FIG. 2, two adjacent beams are slightly overlapped. A beam switching is necessary when the UE moves from one beam to another beam. In FIG. 2, UE1 and UE3 are located in different overlapping areas. In FIG. 2, there is an area where three or more beams are superpositioned. For example, UE2 is located in the overlapped area of beam (i−1), beam i, and beam (i+1). Between adjacent two beams, a boundary may be set based on the criterion of the strongest reception power from gNB. For example, UE1 located between a boundary A and a boundary B may be served by beam (i−1) since the reception strength of the beam (i−1) is the strongest. For the Tx beam sweeping or the Rx beam sweeping, the base station may perform beam sweeping in order of increasing or decreasing of the beam index. For example, the order of the beam sweeping may be 1, 2, . . . (i−1), i, (i+1), . . . N.

Referring to FIG. 3, two possible beam patterns for the UE are shown. To reduce the complexity of the UE and the beam switching probability on the UE side, a limited number of beams, e.g. two or three beams (quite limited number of beams) may be used in the UE. The Tx beam sweeping and the Rx beam sweeping on the UE side may be an implementation issue.

Figure 4A:
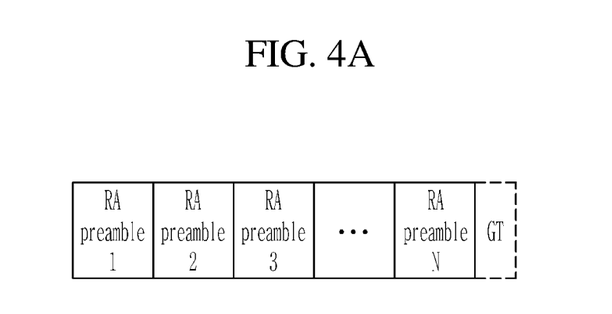
FIGS. 4A to 4C show schematic diagrams illustrating a PRACH resource according to an exemplary embodiment.
Figure 4B:
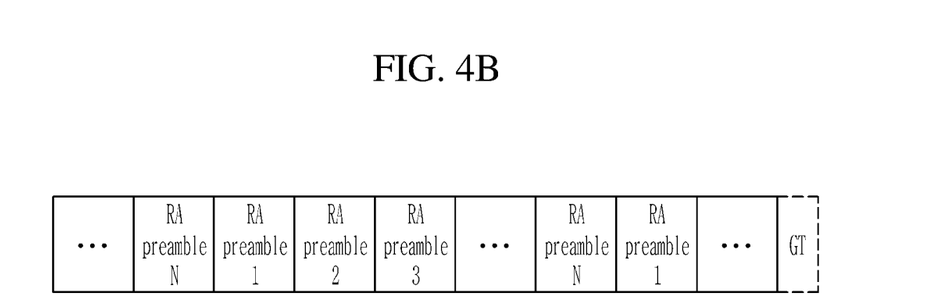
Figure 4C:
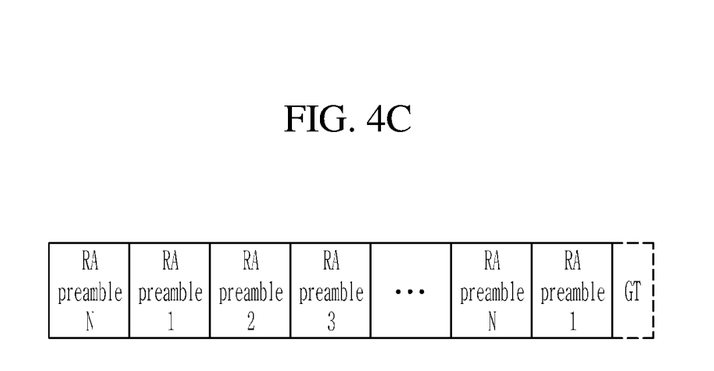
Figure 5:
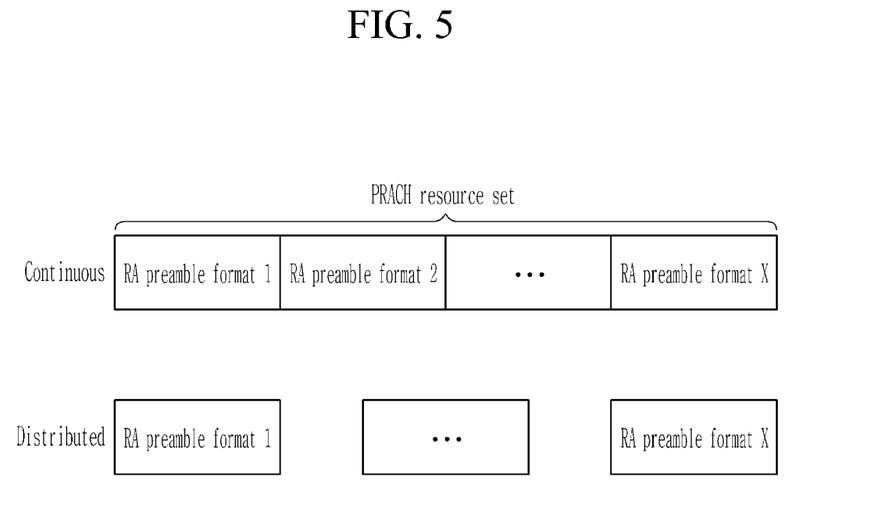
FIG. 5 is a schematic diagram illustrating a PRACH resource according to another exemplary embodiment.
Figure 6:
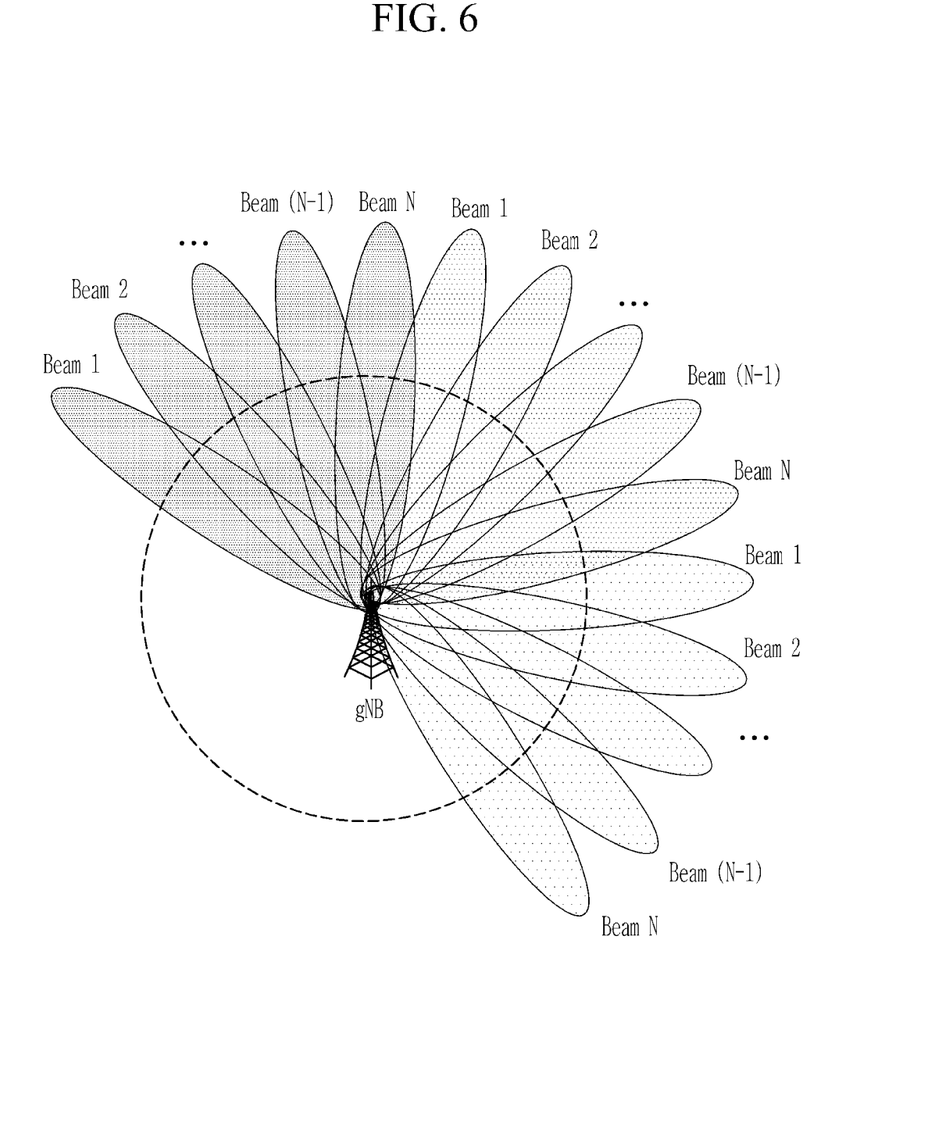
FIG. 6 is a diagram illustrating multi-beam pattern according to an exemplary embodiment.

FIGS. 4A to 4C are schematic diagrams illustrating a PRACH resource according to an exemplary embodiment, FIG. 5 is a schematic diagram illustrating a PRACH resource according to another exemplary embodiment, and FIG. 6 is a diagram illustrating multi-beam patterns according to an exemplary embodiment.

FIGS. 4A to 4C indicate a PRACH resource for the Rx beam sweeping performed by the base station. In FIG. 4A, the base station performs the Rx beam sweeping based on N consecutive RA preamble resources. N represents the total number of reception beams of the base station. Each UE may transmit the RA preamble 1 to the RA preamble N of FIG. 4 as the message 1 of the RA procedure. Y in FIG. 1 and N in FIGS. 4A to 4C are different numbers, N represents the number of RA preamble that the UE transmits as the message 1, and Y represents the total number of the RA preambles available for the PRACH resource.

When the UE performs the Tx beam sweeping, the PRACH resource set covers both the Tx beam sweeping of the UE and the Rx beam sweeping of the base station. Referring to FIG. 5, when the number of the Tx beam of the UE is L (i.e., the PRACH resource set includes L RA preamble formats), the L PRACH resources are occupied for both the Tx beam sweeping of the UE and the Rx beam sweeping procedure of the base station. The L PRACH resources (i.e., RA preamble formats) in the PRACH resource set may be located in the time domain by a continuous manner or a distributed manner.

Referring to FIG. 6, a beam group for the reception of the base station is shown. Each beam group may be distinguished by different beam boundaries and filling shade. Each beam group includes a plurality of beams. The plurality of beams may be grouped in order to reduce the length of the PRACH resources. Each beam group includes N beams and the number of beam groups may be M. The PRACH resource and the PRACH resource set according to the exemplary embodiment may be applied separately for each beam group.

Figure 7:
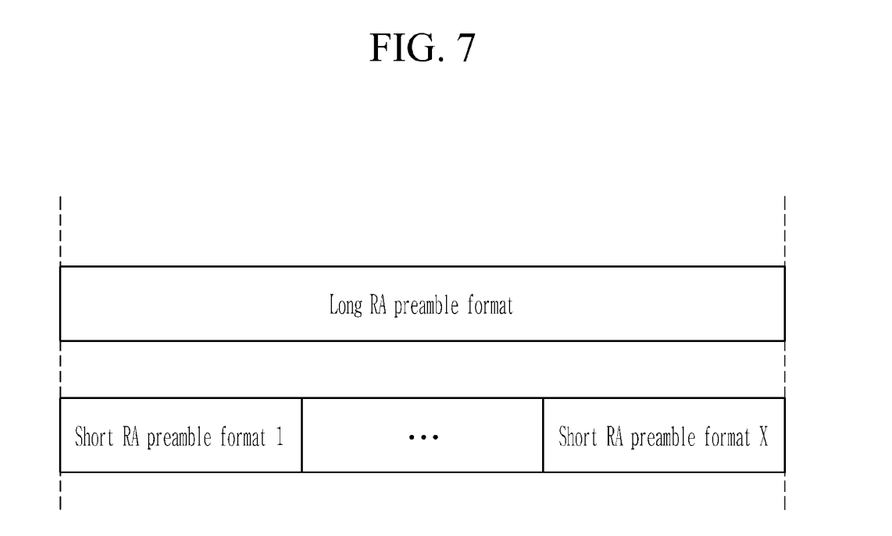
FIG. 7 is a schematic diagram illustrating an RA preamble format according to an exemplary embodiment.
Figure 8:
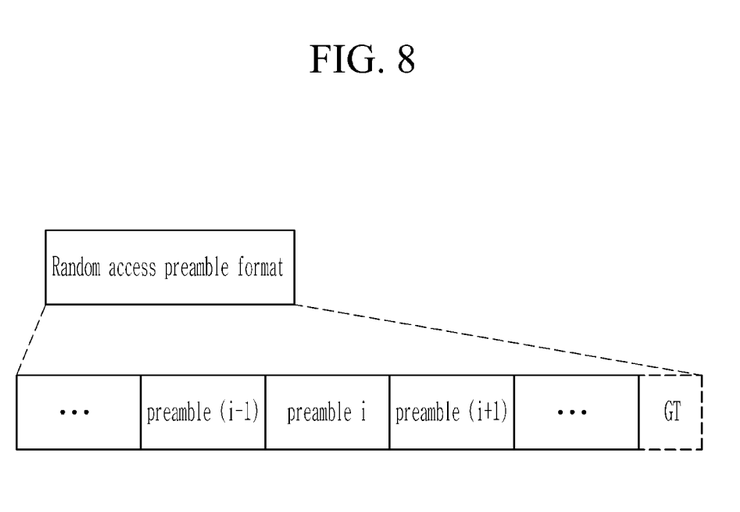
FIG. 8 is a schematic diagram illustrating an RA preamble format according to another exemplary embodiment.
Figure 9:
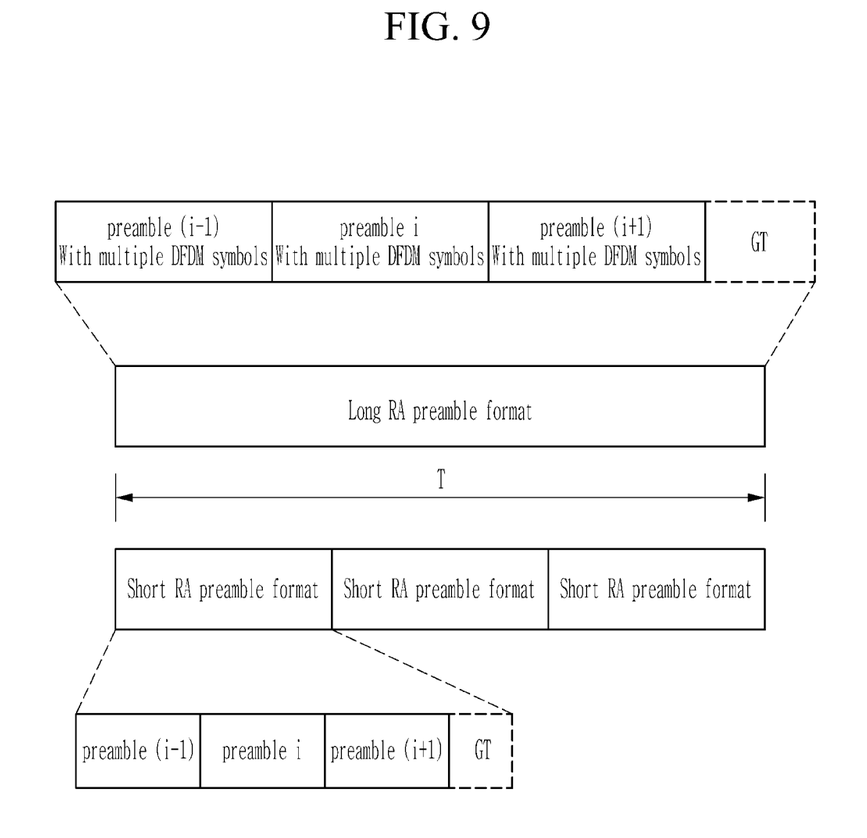
FIG. 9 is a schematic diagram illustrating an RA preamble format according to yet another exemplary embodiment.
Figure 10:
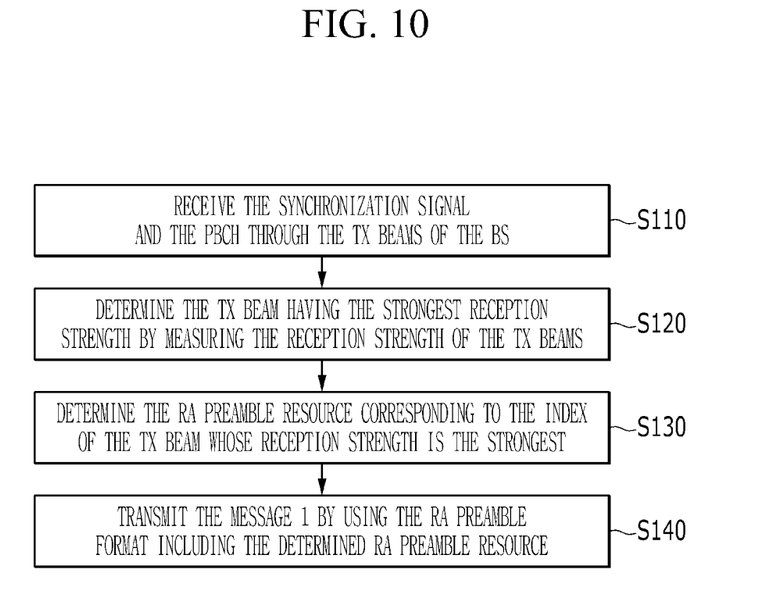
FIG. 10 is a flowchart illustrating a method for transmitting an RA message by the UE according to an exemplary embodiment.

FIG. 7 is a schematic diagram illustrating an RA preamble format according to an exemplary embodiment, FIG. 8 is a schematic diagram illustrating an RA preamble format according to another exemplary embodiment, FIG. 9 is a schematic diagram illustrating an RA preamble format according to yet another exemplary embodiment, and FIG. 10 is a flowchart illustrating a method for transmitting an RA message by the UE according to an exemplary embodiment.

In the 3GPP NR system, the UE may use a long RA preamble format or a short RA preamble format. In an exemplary embodiment, two types of the long RA preamble format is suggested. Each preamble includes a plurality of OFDM symbols. The long RA preamble format 1 may be used to transmit the message 1 of the RA procedure, and the long RA preamble format 2 may be used for retransmission of the message 1.

In FIG. 7, numerology in the time domain for the long RA preamble format 1 and the short RA preamble format is shown. The time length of the long RA preamble format 1 is the same as the time length of a plurality of the short RA preamble formats (X short RA preamble formats, X is an integer). The time length of the long RA preamble format 1 is designed to be equal to the time length of the plurality of short RA preamble formats, thereby ensuring the conformance of the PRACH and matching the PRACH resource with a fixed length to all preamble formats. For example, in the LTE system, the short RA preamble format may correspond to the LTE preamble format 0 and the long RA preamble format may correspond to LTE preamble format 3. The time length of the LTE preamble format 3 is equal to three times the LTE preamble format 0. According to the exemplary embodiment, the long RA preamble format 1 may be used for cells with relatively wide coverage, and the short RA preamble format can be used for cells with relatively narrow coverage.

Referring to FIG. 8, both the long RA preamble format and the short RA preamble format according to the exemplary embodiment may include the GT and the plurality of preamble resources. Each preamble resource i corresponds to a synchronization signal block (SSB) index which corresponds to a transmission beam of the base station. The transmission beam having the SSB index which corresponds to the preamble resource i may be determined based on the a plurality of criterions by the UE. For example, a transmission beam having the strongest reception strength among a plurality of Tx beams of the base station is selected by the UE. Alternatively, a Tx beam of which reception strength is measured higher than a threshold value is selected. When a plurality of Tx beams having the reception strength measured higher than the threshold value are selected, one of the Tx beam may be selected based on a predetermined criterion. For example, a Tx beam arrived at the earliest may be selected among the plurality Tx beams of which the reception strength measured higher than the threshold value. The plurality of Tx beams of the base station are used to broadcast system information through a beam-specific synchronization signal (SS) and a physical broadcast channel (PBCH). That is, referring to FIG. 10, the UE receives the synchronization signal and the PBCH through the Tx beams of the base station in order to receive the system information from the base station (S110), and then determines the Tx beam having the strongest reception strength among the Tx beams by measuring the reception strength of the Tx beams of the base station (S120). Then, the UE determines the RA preamble resource corresponding to the SSB index of the Tx beam of which a reception strength is the strongest (S130), and transmits the message 1 of the RA procedure by using the RA preamble format including the RA preamble resource which corresponds to the Tx beam having the strongest reception strength (S140).

Since a plurality of Tx beams from adjacent base stations have overlapped area, the UE may receive multiple pieces of information (SS+PBCH) from different Tx beams. For example, the UE1 and the UE3 in FIG. 2 may receive 2 pieces of information from 2 different beams, while the UE2 may receive 3 pieces of information from 3 different beams. When the beam correspondence at the base station holds, the UE may send its message 1 by using an RA preamble format, which contains only a single preamble, to the i-th beam of the base station. However, when the beam correspondence at the base station does not exist, the UE sends an RA preamble format including multiple preambles for the Rx beam sweeping of the base station. When the UE sends the message 1 by using the preamble, the UE may send a subset of N preambles for Rx beam calibration of the base station.

Referring to FIG. 9, an exemplary embodiment where the variables X, Y, and Z described above are set to 3 is shown. In FIG. 9, the length of the long RA preamble format 1 is T and the length of the short RA preamble format is T/3. Each preamble format includes 3 preambles for the beam sweeping. The i-th preamble resource may correspond to the strongest Tx beam of the base station received by the UE, where i is the index of the preamble resource and corresponds to the index of the downlink (DL) Tx beam of the base station. The Tx beam is used to receive (SS+PBCH) information from the base station by the UE. For example, the UE1 in FIG. 2 receives (SS+PBCH) information from the beam (i−1) and the beam i. Based on the location of UE1 (between the boundary A and the boundary B), the reception strength of the beam (i−1) at the UE1 may be larger than the reception strength of the beam i. Therefore, for the Rx beam sweeping of the base station, the UE1 may transmit the message 1 by using the RA preamble format including the preamble resource (i−2), the preamble resource (i−1), and the preamble resource i which correspond to the Rx beam (i−2), the Rx beam (i−1), and the Rx beam i of the base station. In this case, the RA preamble format may include the GT period allocated at the end of the 3 preamble resources. The UE1 uses beam (i−2) in consideration of uncertainty (loss of the beam correspondence in the base station) due to error or mobility. The message 1 of the UE2 is transmitted through the RA preamble format including the preamble resource (i−1), the preamble resource i, and the preamble resource (i+1) which correspond to the Rx beam (i−1), the Rx beam i, and the Rx beam (i+1) of the base station. The message 1 of the UE3 is transmitted through the RA preamble format including the preamble resource i, the preamble resource (i+1), and the preamble resource (i+2) which correspond to the Rx beam i, the Rx beam (i+1), and the Rx beam (i+2) of the base station.

Figure 11:
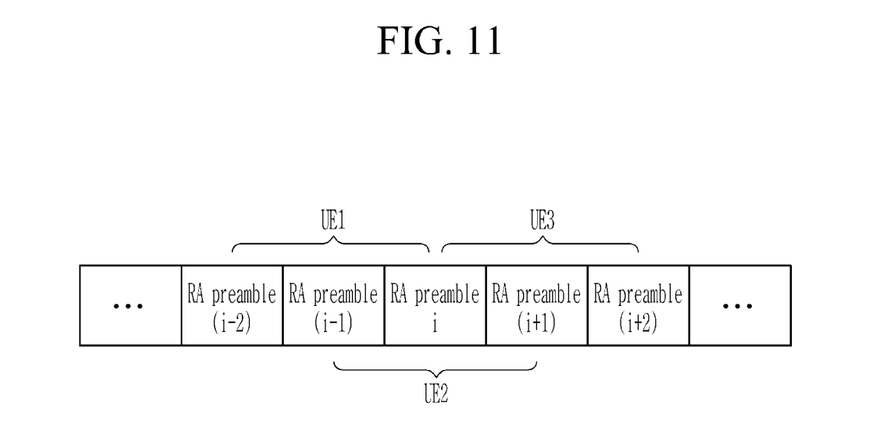
FIG. 11 is a schematic diagram illustrating an RA preamble occupied by the UEs according to an exemplary embodiment.

FIG. 11 is a schematic diagram illustrating an RA preamble occupied by the UEs according to an exemplary embodiment.

Referring to FIG. 11, a problem may arise when each UE of FIG. 2 transmits three RA preambles using the PRACH resource of FIG. 4A. Referring to FIG. 6, a particular UE measures the strength of the transmission beam 1 included in beam group 2 as the strongest, and may transmit the RA preamble through the preamble resource N, the preamble resource 1, and the preamble resource 2 corresponding to the Tx beam N, Beam 1, and Beam 2. That is, when the strongest Tx beam is located at the boundary of each beam group, the UE transmitting three RA preambles may select the preamble resource corresponding to the SSB index which corresponds to a transmission beam of the adjacent beam group. At this time, if the UE uses the PRACH resource structure of FIG. 4A, the UE may not use adjacent preamble resources as shown in FIG. 11. Therefore, the UE may transmit an RA preamble through neighboring preamble resources using the PRACH resource structure of FIG. 4B or 4C. The values of X, Y, Z, L, M, and N above may be variable.

In an RA procedure according to the exemplary embodiment, the UE may use the long RA preamble format 2 for retransmission of the message 1. In the multi-beam operation without the beam correspondence, if the base station has failures of Rx beam calibration, the RA preamble format transmitted by the UE may also fail. For example, when a UE transmits a message 1 by using an RA preamble format including a preamble resource (i−1), a preamble resource i, and a preamble resource (i+1), the base station may incorrectly detect the message 1 since the base station detects other preamble resources with other beams. Reception of the message 1 may fail when the UE moves outside the coverage of the Tx beam used to broadcast the synchronization signal or the like, or when the detection of the downlink beam index of the base station is erroneous.

Therefore, in order to increase the retransmission success rate of the message 1, the UE may increase the transmission power of the retransmission of the message 1 by using a power ramping scheme, and may also increase the size of the preamble resource for retransmission of the message 1. According to the exemplary embodiment, the UE may retransmit message 1 by using the long RA preamble format 2. For example, the long RA preamble format 2 may include five RA preamble resources while the long RA preamble format 1 includes three RA preamble resources. If the retransmission of message 1 also fails, the UE may retransmit message 1 by using an RA preamble format which includes seven RA preamble resources. That is, the long RA preamble format 2 according to the exemplary embodiment may include a larger number of RA preamble resources according to the number of retransmissions of the message 1.

By optimizing the transmission and reception of random access messages to the system in which the multi-beam operation is performed, the complexity of the random access procedure can be lowered and the delay can be reduced.

Figure 12:
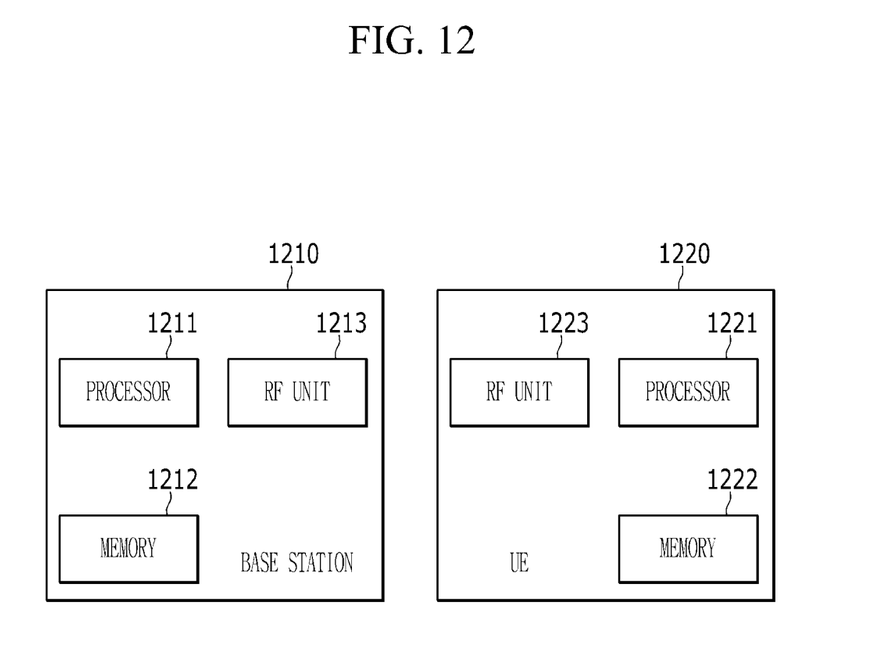
FIG. 12 is a block diagram illustrating a wireless communication system according to an exemplary embodiment.

FIG. 12 is a block diagram illustrating a wireless communication system according to an exemplary embodiment.

Referring to FIG. 12, a wireless communication system according to an exemplary embodiment includes a base station 1210 and a terminal 1220.

The base station 1210 includes a processor 1211, a memory 1212, and a radio frequency unit (RF unit) 1213. The memory 1212 may be connected to the processor 1211 to store various pieces of information for driving the processor 1211 or at least one program executed by the processor 1211. The radio frequency unit 1213 may be connected to the processor 1211 to transmit/receive a wireless signal. The processor 1211 may implement functions, processes, or methods proposed by the exemplary embodiment. In this case, in the wireless communication system according to the exemplary embodiment, a wireless interface protocol layer may be implemented by the processor 1211. An operation of the base station 1210 according to the exemplary embodiment may be implemented by the processor 1211.

The terminal 1220 includes a processor 1221, a memory 1222, and a radio frequency unit 1223. The memory 1222 may be connected to the processor 1221 to store various pieces of information for driving the processor 1221 or at least one program executed by the processor 1221. The radio frequency unit 1223 may be connected to the processor 1221 to transmit/receive a wireless signal. The processor 1221 may implement functions, processes, or methods proposed by the exemplary embodiment. In this case, in the wireless communication system according to the exemplary embodiment, a wireless interface protocol layer may be implemented by the processor 1221. An operation of the terminal 1220 according to the exemplary embodiment may be implemented by the processor 1221.

According to the exemplary embodiment of the present invention, the memory may be positioned inside or outside the processor, and the memory may be connected to the processor through various already-known means. The memory may be various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting, from a user equipment (UE) to a base station, a message 1 of a random access (RA) procedure, comprising:
   determining a first RA preamble resource corresponding to an index of a synchronization signal block (SSB), wherein the SSB is received through one or more transmission beams among a plurality of transmission beams of the BS; and
   transmitting the message 1 of the RA procedure by using a first RA preamble format through the first RA preamble resource and at least one second RA preamble resource which is adjacent to the first RA preamble resource, wherein the first RA preamble format includes the first RA preamble resource and the at least one second RA preamble resource.

2. The method of claim 1,
   wherein an index of the at least one second RA preamble resource is i−1 or i+1 if an index of the first RA preamble resource is i.

3. The method of claim 1,
   wherein a guard time (GT) period is allocated at an end of the first RA preamble resource and the at least one second RA preamble resource on a time axis.

4. The method of claim 1,
   wherein the message 1 includes a cyclic prefix (CP) and a preamble sequence, and the preamble sequence includes a plurality of orthogonal frequency division multiplexing (OFDM) symbols.

5. The method of claim 1,
   wherein the first RA preamble format is a long RA preamble format or a short RA preamble format, and a time length of the long RA preamble format is an integer multiple of a time length of the short RA preamble format.

6. The method of claim 5, wherein the transmitting the message 1 comprises
   transmitting the message 1 by using the long RA preamble format if a coverage of a cell of the BS is relatively wide; or transmitting the message 1 by using the short RA preamble format if the coverage of the cell is relatively small.

7. The method of claim 1, further comprising:
   re-transmitting the message 1 by using a second RA preamble format having a longer time length than the first RA preamble format if the BS fails to receive the message 1.

8. The method of claim 1, further comprising:
   receiving a synchronization signal in the SSB through the plurality of transmission beams from the BS; and
   measuring a reception strength of the plurality of transmission beams.

9. User equipment (UE) for transmitting a message 1 of a random access (RA) procedure, comprising:
   a processor, a memory, and a radio frequency (RF) unit,
   wherein the processor executes a program stored in the memory to perform:
   determining a first RA preamble resource of which an index is the same as an index of a synchronization signal block (SSB), wherein the SSB is received through one or more transmission beams among a plurality of transmission beams of the BS; and
   transmitting, by using the RF unit, the message 1 of the RA procedure by using a first RA preamble format through the first RA preamble resource and at least one second RA preamble resource which is adjacent to the first RA preamble resource, wherein the first RA preamble format includes the first RA preamble resource and the at least one second RA preamble resource.

10. The UE of claim 9,
    wherein an index of the at least one second RA preamble resource is i−1 or i+1 if an index of the first RA preamble resource is i.

11. The UE of claim 9,
    wherein a guard time (GT) period is allocated at an end of the first RA preamble resource and the at least one second RA preamble resource on a time axis.

12. The UE of claim 9,
    wherein the message 1 includes a cyclic prefix (CP) and a preamble sequence, and the preamble sequence includes a plurality of orthogonal frequency division multiplexing (OFDM) symbols.

13. The UE of claim 9,
    wherein the first RA preamble format is a long RA preamble format or a short RA preamble format, and a time length of the long RA preamble format is an integer multiple of a time length of the short RA preamble format.

14. The UE of claim 13,
    wherein when the transmitting of the message 1, the processor performs
    transmitting, by using the RF unit, the message 1 by using the long RA preamble format if a coverage of a cell of the BS is relatively wide; or transmitting the message 1 by using the short RA preamble format if the coverage of the cell is relatively small.

15. The UE of claim 9,
    wherein the processor executes the program to further perform
    re-transmitting, by using the RF unit, the message 1 by using a second RA preamble format having a longer time length than the first RA preamble format if the BS fails to receive the message 1.

16. The UE of claim 9,
    wherein the processor executes the program to further perform:
    receiving, by using the RF unit, a synchronization signal in the SSB through the plurality of transmission beams from the BS; and
    measuring the reception strength of the plurality of transmission beams.

17. A method for receiving a message 1 during a random access (RA) procedure from user equipment (UE), comprising:
- transmitting a synchronization signal and a physical broadcasting channel (PBCH) through a plurality of transmission beams to the UE; and
- receiving the message 1 through a first RA preamble resource and at least one second RA preamble resource being adjacent to the first RA preamble resource which are determined based on a reception strength of the plurality of transmission beams by performing a reception beam sweeping.

\* \* \* \* \*